(12) United States Patent
Klein et al.

(10) Patent No.: US 10,697,390 B2
(45) Date of Patent: Jun. 30, 2020

(54) GASOLINE REID VAPOR PRESSURE DETECTION SYSTEM AND METHOD FOR A VEHICLE PROPULSION SYSTEM

(71) Applicant: GM GLOBAL TECHNOLOGY OPERATIONS LLC, Detroit, MI (US)

(72) Inventors: Dale F. Klein, Hartland, MI (US); Andrew M. Shaw, Fenton, MI (US); Michael Gwidt, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 243 days.

(21) Appl. No.: 15/947,018

(22) Filed: Apr. 6, 2018

(65) Prior Publication Data

US 2019/0309701 A1    Oct. 10, 2019

(51) Int. Cl.
*F02D 41/38* (2006.01)

(52) U.S. Cl.
CPC .. *F02D 41/3854* (2013.01); *F02D 2200/0602* (2013.01); *F02D 2200/0604* (2013.01); *F02D 2200/0606* (2013.01)

(58) Field of Classification Search
CPC .......... F02D 41/3836–3854; F02D 2200/0602; F02D 2200/0606; F02D 2200/0614
USPC ................. 73/114.42, 114.43; 123/446, 456
See application file for complete search history.

(56) References Cited

U.S. PATENT DOCUMENTS

| 5,878,727 | A | 3/1999 | Huls |
| 5,884,610 | A | 3/1999 | Reddy |
| 6,499,476 | B1 | 12/2002 | Reddy |
| 6,708,671 | B1 * | 3/2004 | Joos .................... F02D 41/1401 123/464 |
| 9,390,565 | B2 | 7/2016 | Thompson et al. |
| 9,850,853 | B2 | 12/2017 | Dudar et al. |
| 10,094,305 | B1 * | 10/2018 | Klein ................... F02D 19/0628 |
| 10,308,103 | B2 * | 6/2019 | Kaneko ...................... F01N 3/20 |
| 2002/0189589 | A1 * | 12/2002 | Kato ...................... F02M 21/08 123/458 |
| 2011/0231082 | A1 * | 9/2011 | Saruwatari .......... F02D 41/0042 701/104 |
| 2013/0298872 | A1 * | 11/2013 | Kojima ............... F02D 41/0025 123/446 |
| 2015/0198081 | A1 * | 7/2015 | Surnilla .............. F02D 41/3094 123/294 |

* cited by examiner

*Primary Examiner* — Erick R Solis
*Assistant Examiner* — Robert A Werner

(57) ABSTRACT

A vehicle propulsion system includes a first pump having an inlet for receiving fuel from a fuel reservoir and an outlet for providing pressurized fuel to a fuel feed line at a first pressure, a fuel feed line pressure sensor, a second pump having an inlet for receiving fuel from the fuel feed line and an outlet for providing pressurized fuel to an engine fuel rail at a second pressure, the second pressure being higher than the first pressure, a fuel temperature sensor, and a controller controlling the first pump to reduce the pressure of the fuel in the fuel feed line and determining whether the pressure of the fuel in the fuel feed line has reached a vaporization pressure of a component in the fuel.

2 Claims, 4 Drawing Sheets

GASOLINE REID VAPOR PRESSURE DETECTION SYSTEM AND METHOD FOR A VEHICLE PROPULSION SYSTEM

FIELD

The present disclosure relates to a gasoline reid vapor pressure detection system and method for a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Gasoline fuels sold for use by automobile vehicles have different volatilities which vary both with different seasons and by different geographic locations. A "winter blend" of fuel is modified to increase its Reid Vapor Pressure (RVP) defined as an absolute vapor pressure exerted by a liquid at 37.8 degrees C. (100 degrees Fahrenheit) as determined by ASTM-D-323, such that the fuel will vaporize more readily at lower winter ambient temperatures. This allows easier engine start. To reduce volatile organic compound (VOC) discharge, a "summer blend" of fuel is modified to decrease its RVP. This reduces fuel vaporization at higher summer operating temperatures both to reduce VOC discharge and to mitigate against vapor lock occurring in the fuel pump system which may cause engine stumble or stall conditions.

The ability to identify the RVP of the fuel offers the advantage of adjusting low pressure fuel feed pump pressure and fuel delivery to an engine in accordance with the identified RVP of the fuel. Different approaches to determine RVP are known, but have limitations related to long time delays to identify the RVP, or suffer from a slow frequency of measurement. The known approaches also do not allow detection of a change in fuel properties immediately after a refueling event, which is most pronounced when a change from winter to summer blend, or vice-versa may have just occurred. There may also be overlap of one blend present in the fuel tank mixing with the second blend during seasonal changes when determination of an accurate RVP is also important.

In the absence of being able to determine the RVP of a gasoline in the vehicle, in order to ensure operation of the vehicle, the worst case must be assumed. This results in energy loss in pressurizing the fuel feed system to a higher pressure than is necessary for the actual RVP of the fuel, improper fuel delivery, especially during starting operations, and/or a decrease in drivability, all of which may adversely affect emissions and performance. There is a need for a new and improved system and method for identifying gasoline RVP for use by the vehicle.

SUMMARY

In an exemplary aspect, a gasoline reid vapor detection system in vehicle propulsion system includes a first pump having an inlet for receiving fuel from a fuel reservoir and an outlet for providing pressurized fuel to a fuel feed line at a first pressure, a fuel feed line pressure sensor that generates a fuel feed line pressure signal that is based upon a pressure of fuel in the fuel feed line, a second pump having an inlet for receiving fuel from the fuel feed line and an outlet for providing pressurized fuel to an engine fuel rail at a second pressure, the second pressure being higher than the first pressure, a fuel temperature sensor that generates a fuel temperature signal that is based upon a temperature of the fuel, and a controller in communication with the first pump for controlling the first pump to control the pressure of the fuel in the fuel feed line. The controller controls the first pump to reduce the pressure of the fuel in the fuel feed line and determines whether the pressure of the fuel in the fuel feed line has reached a vaporization pressure of a component in the fuel.

In this manner, the performance, efficiency, and emissions of the vehicle propulsion system may be improved. In particular, the fuel feed line pressure may be reduced, thereby saving energy, and fuel delivery may be further optimized, especially during starting operations.

In another exemplary aspect, the controller monitors a performance characteristic of the second pump to determine whether the pressure of the fuel in the fuel feed line has reached a vaporization pressure of a component in the fuel.

In another exemplary aspect, the second pump performance characteristic includes a second pump fuel delivery amount.

In another exemplary aspect, the second pump performance characteristic includes a delivery duration for the second pump.

In another exemplary aspect, the system further includes a fuel rail pressure sensor that generates a fuel rail pressure signal based upon a pressure of fuel in the fuel rail, the second pump performance characteristic includes a fuel rail pressure rise in the fuel rail per stroke of the second pump.

In another exemplary aspect, the controller determines whether the pressure of the fuel in the fuel feed line has reached a vaporization pressure of a component in the fuel based upon the fuel rail pressure rise in the fuel rail per stroke of the second pump is less than a predetermined amount.

In another exemplary aspect, the controller generates a slow filtered signal based upon a slow filter of the fuel rail pressure rise in the fuel rail per stroke of the second pump and a fast filtered signal based upon a fast filter of the fuel rail pressure rise in the fuel rail per stroke of the second pump, and the controller determines whether the pressure of the fuel in the fuel feed line has reached a vaporization pressure of a component in the fuel based upon a comparison of the slow filtered signal to the fast filtered signal.

In another exemplary aspect, the controller determines whether the pressure of the fuel in the fuel feed line has reached a vaporization pressure of a component in the fuel based upon a determination that the slow filtered signal has a value that exceeds a value of the fast filtered signal.

In another exemplary aspect, the controller determines whether the pressure of the fuel in the fuel feed line has reached a vaporization pressure of a component in the fuel based upon the fuel feed line pressure signal.

In another exemplary aspect, the controller determines whether the pressure of the fuel in the fuel feed line has reached a vaporization pressure of a component in the fuel based upon a comparison of the fuel feed line pressure signal and a commanded fuel feed line pressure.

In another exemplary aspect, the controller determines whether the pressure of the fuel in the fuel feed line has reached a vaporization pressure of a component in the fuel based upon whether the fuel feed line pressure signal differs from the commanded fuel feed line pressure by more than a predetermined amount.

In another exemplary aspect, the controller further determines the reid vapor pressure of the fuel based upon the fuel temperature and fuel pressure in the fuel feed line when the controller determines whether the pressure of the fuel in the fuel feed line has reached a vaporization pressure of a component in the fuel In another exemplary aspect, the controller further adjusts the fuel pressure in the fuel feed line based upon the fuel pressure in the fuel feed line when the controller determines whether the pressure of the fuel in the fuel feed line has reached a vaporization pressure of a component in the fuel.

In another exemplary aspect, the controller further adjusts the delivery of fuel by the second pump when the controller determines that the pressure of the fuel in the fuel feed line has reached a vaporization pressure of a component in the fuel.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
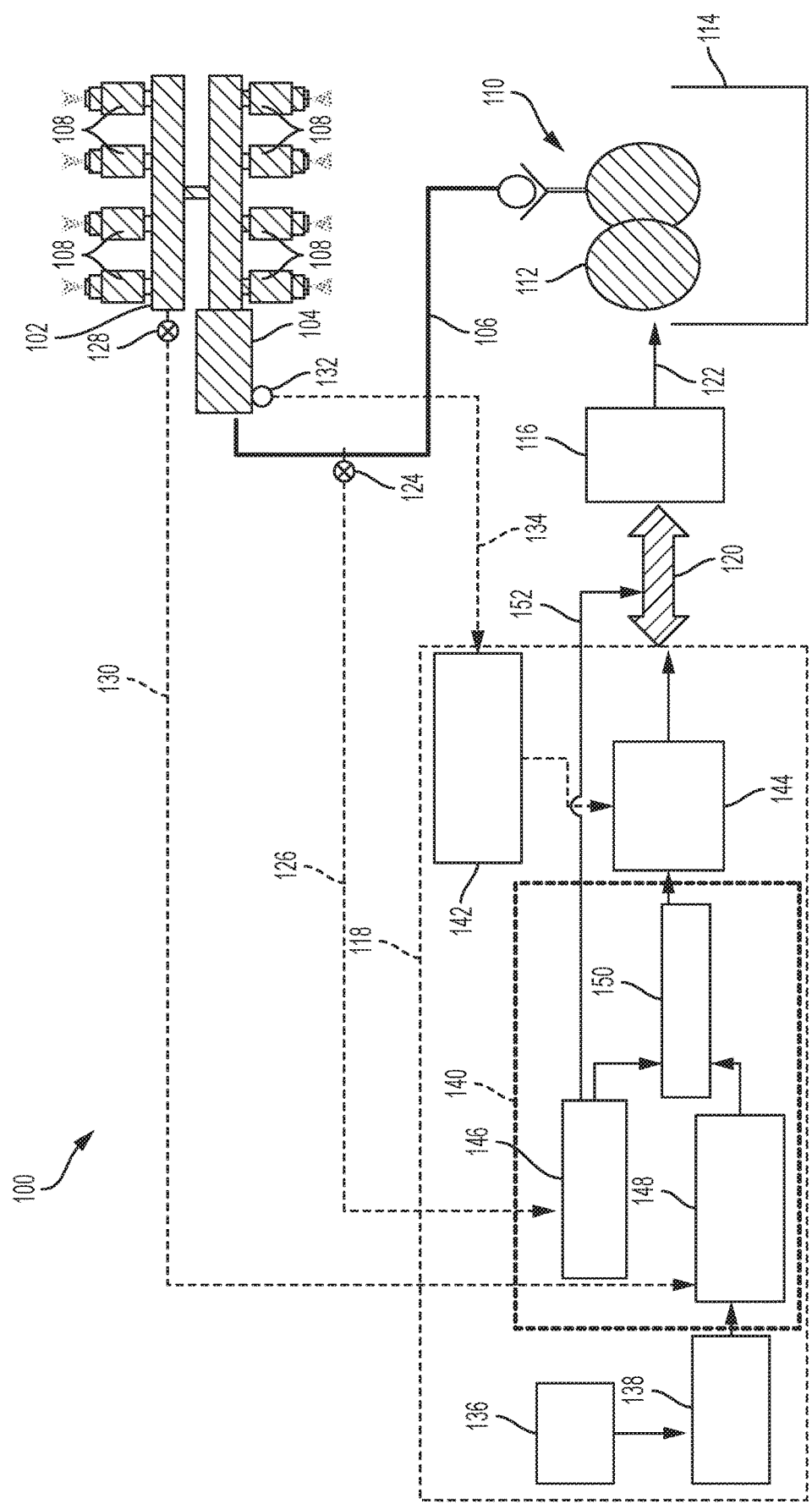
FIG. 1 is a schematic illustration of an exemplary gasoline reid vapor pressure detection system for a vehicle propulsion system.

Referring now to the drawings, wherein the showings are for the purpose of illustrating certain exemplary embodiments only and not for the purpose of limiting the same, FIG. 1 schematically depicts an exemplary gasoline reid vapor pressure detection system 100 for a vehicle propulsion system. The gasoline RVP detection system 100 includes a fuel rail 102 supplied with gasoline fuel using a high pressure pump (HPP) 104 which is fed from a lower pressure fuel feed line 106. Multiple fuel injectors 108 are connected to the fuel rail 102 for supplying the high pressure fuel from the fuel rail 102 to individual engine cylinders (not shown). Fuel is supplied to the fuel feed line 106 using a low pressure pump 110 driven by motor 112. The low pressure pump 110 draws the fuel from a reservoir 114 with the low pressure pump 110, the motor 112, and the reservoir 114 all positioned within a fuel feed tank (not shown).

Motor 112 is controlled using signals from a fuel tank zone module 116 which is in communication with an engine control module (ECM) 118 across a controller area network (CAN) bus 120 and a low pressure pump control signal 122. A fuel feed line pressure sensor 124 monitors the pressure of the fuel in the fuel feed line 106 and sends a fuel feed pressure signal 126 to the controller 118. Similarly, a fuel rail pressure sensor 128 monitors the pressure of the fuel in the fuel rail 102 and provides a fuel rail pressure signal 130 to the controller 118. Additionally, a fuel temperature sensor 132 monitors the temperature of the fuel and sends a fuel temperature signal 134 to the controller 118. While the exemplary embodiment of FIG. 1 includes a fuel temperature sensor 132 positioned adjacent to the high pressure pump 104, the location of the fuel temperature sensor 132 may be re-located to any position so long as a fuel temperature signal is provided to the controller 118 without limitation. The fuel temperature signal 134 may be the result of a virtual sensor using a calibrated model and other existing temperatures (outside ambient air, intake air, intake manifold, engine coolant) and vehicle operating states.

The controller 118 includes a number of modules, an exemplary set of which, will be described with reference to FIG. 1 together with the subsequent figures and accompanying descriptions. In this embodiment, the controller 118 includes an engine mode module 136, an RVP learn enable module 138, an RVP learn module 140, a fuel temperature module 142, and a fuel system RVP adapt module 144. The RVP learn module 140 includes a fuel feed line module 146, a fuel rail module 148, and a vapor detection module 150.

Figure 2:
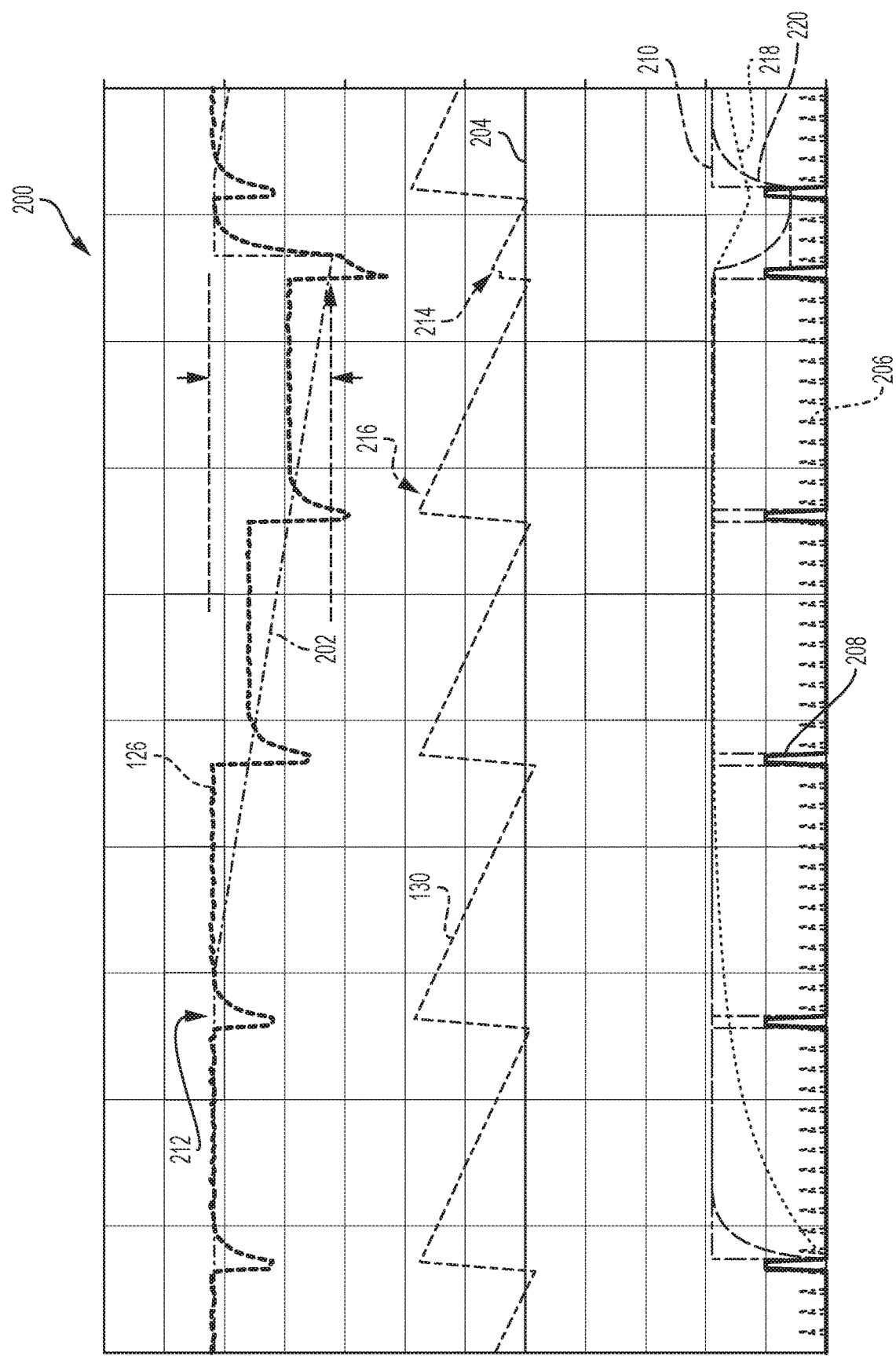
FIG. 2 illustrates operation of the gasoline reid vapor pressure detection system 100 of FIG. 1 in accordance with an exemplary method of the present disclosure.

FIG. 2 illustrates operation of the gasoline reid vapor pressure detection system 100 of FIG. 1 in accordance with an exemplary method of the present disclosure. The graph 200 of FIG. 2 illustrates the fuel feed pressure 126 as measured by the fuel feed line pressure sensor 124 and a commanded (or target) fuel feed pressure 202, which generally corresponds to the low pressure pump control signal 122 sent by the fuel tank zone module 116 to the low pressure pump motor 112. The graph 200 further illustrates fuel rail pressure signal 130 as generated by the fuel rail pressure sensor 128. In general, the controller 118 controls operation of the high pressure pump 104 in a manner which maintains the fuel rail pressure 130 above a fuel rail target pressure 204.

The graph 200 of FIG. 2 further illustrates operation of the high pressure pump 104. The high pressure pump 104 may be a positive displacement pump having a controllable inlet amount. The high pressure pump 104 constantly operates and the speed of the pump 104 is based directly upon the speed of the engine. Signal line 206 illustrates a series of spikes, each spike corresponding to a starting position of each operating cycle or stroke of the high pressure pump 104. In the operation illustrated by FIG. 2, the high pressure pump 104 is operated such that a full amount of fuel is delivered only intermittently. Pump inlet actuation signal 208 illustrates the actuation of the high pressure pump 104 on selected cycles. The graph of FIG. 2 further illustrates the fuel rail pressure rise per stroke at 210.

During operation, actuation of the inlet for the high pressure pump 104 results in the fuel rail pressure 130 jumping upward such as at the instant indicated at 212. Subsequent to pump inlet actuation, the high pressure pump 104 draws additional fuel from the fuel feed line 106 and the resultant pressure drop in the fuel feed line 106 is clearly illustrated by the immediate drop in fuel feed pressure signal 126. The pressure 126 in the fuel feed line 106 again increases as the low pressure pump 110 continues to provide fuel to the fuel feed line 106. As the engine operates, the fuel injectors 108 continue to feed fuel to the engine, thus, the fuel rail pressure 130 gradually ramps down until it approaches the fuel rail target 204 where the controller 118 triggers another pump inlet actuation 208.

In an exemplary method, the controller 118 relies upon engine mode module 136 to determine the operating mode of then engine and to indicate the determined engine mode to the RVP learn enable module 138. The RVP learn enable module 138 determines whether the engine operating mode is appropriate for enabling the RVP learn algorithm 140. If the RVP learn enable module 138 determines that the engine operating mode is appropriate, then the RVP learn enable module 138 may enable operation of the RVP learn module 140.

If enabled, the RVP learn module 140 may rely upon the fuel rail module 148 to monitor the fuel rail pressure 130. Further, in an exemplary embodiment, the fuel rail module 148 may also monitor fuel delivery for each stroke of the high pressure pump 104, the duty cycle of the high pressure pump, and/or other characteristics of the fuel rail 102 or high pressure pump 104 without limitation. Additionally, if enabled, the RVP learn module 140 may rely upon the fuel feed line module 146 to monitor the feed line pressure 130. The vapor detection module 150 may then determine whether the fuel may have vaporized based upon the conditions monitored by the fuel feed line module 146 and the fuel rail module 148. In an exemplary embodiment, the vapor detection module 150 may determine the fuel rail pressure rise per stroke 210.

When enabled, in an exemplary aspect, the fuel feed line module 146 may send a low pressure pump control signal 152 across the CAN 120 through the fuel tank zone module 116 and to the low pressure pump 110 to cause a decrease or ramp down in the fuel feed line target pressure 202. This ramping down of the fuel feed line target pressure 202 results in a gradual decrease in the fuel feed line pressure 126 as the high pressure pump 104 continues to periodically draw fuel from the fuel feed line 106. This continues until the pressure in the fuel feed line 106 drops below the vapor pressure of a component in the fuel at which point at least a portion of the fuel vaporizes. The volume occupied by the vaporized fuel is substantially larger than the volume that would have been occupied had that vaporized portion remained in a liquid state. As a result, when the high pressure pump 104 draws a volume of fuel from the fuel feed line 106 the overall mass of the fuel is reduced. The high pressure pump 104 then operates to increase the pressure on the volume of fuel, the volume reduces, and the fuel rail pressure 130 does not reach the previously achieved level. In FIG. 2, the fuel rail pressure 130 at instant 214, as a result of the reduced mass of fuel in the volume of fuel output into the fuel rail 102, is much lower than that previously achieved, such as at, for example, instant 216 where the volume of fuel output into the fuel rail 102 by the high pressure pump 104 did not originate from a volume of fuel which included vaporized fuel entering in the high pressure pump 104 from the fuel feed line 106.

In an exemplary aspect of the present disclosure, the vapor detection module 150 recognizes this reduction in pressure in the fuel rail 102 as an indicator that the fuel that entered the high pressure pump 104 included at least a portion of vaporized fuel. The manner in which this recognition occurs may vary without limitation. For example, a simple comparison between the reduced amplitude of the fuel rail pressure 130 may be relied upon to determine whether the fuel in the fuel feed line 106 includes a vaporized component. In an exemplary aspect, the vapor detection module 150 may analyze the fuel pressure rise per stroke 210 to determine whether the fuel feed line pressure 126 has dropped to a pressure at which a component of the fuel may have vaporized.

In another exemplary aspect, the fuel rail pressure rise per stroke 210 may be filtered to generate a slow filtered signal 218 of the fuel rail pressure rise per stroke signal 210 and a fast filtered signal 220 of the fuel rail pressure rise per stroke signal 210. Under normal operating conditions, the amplitude of the slow filtered signal 218 will be less than the amplitude of the fast filtered signal 220. In an exemplary aspect, the vapor detection module 150 may compare the slow filtered signal 218 to the fast filtered signal 220 and determine whether the amplitude of the slow filtered signal 218 exceeds the amplitude of the fast filtered signal 200. If the vapor detection module 150 determines that the amplitude of the slow filtered signal 218 exceeds the amplitude of the fast filtered signal 200, then that may serve as an indicator that the fuel feed line pressure 126 has dropped below a vapor pressure of a component of the fuel. In response, in an exemplary aspect, the fuel system RVP adapt module 144 may increase the fuel feed line pressure target 202 and the fuel tank zone module 116 may operate the low pressure pump 110 in a manner to increase the fuel feed line pressure 126.

In an exemplary aspect, the fuel system RVP adapt module 144 (or other appropriate module in the engine control module 118, without limitation) may store the value of the fuel feed pressure 126 at the instant where the vapor detection module 150 detected the presence of fuel vapor in the fuel feed line 106 together with the temperature of the fuel as provided by the fuel temperature module 142. It is understood that the temperature and the pressure at which a component of fuel vaporizes may be correlated to the reid vapor pressure of that fuel. Further, the confidence in reid vapor pressure identification may be further improved by collecting a plurality of data sets, each including the temperature and pressure associated with an identification of fuel vaporization as provided by the present disclosure. For example, this data may be plotted and compared to fuel distillation curves of known fuels and known reid vapor pressures and the distillation curve which most closely correlates to the temperature/pressure data collected with the present disclosure may reliably identify the reid vapor pressure of a fuel.

As explained previously, the fuel system of FIG. 2 controls the high pressure pump 104 such that it delivers a full volume of fuel only periodically, while the remaining stroke cycles deliver no fuel. In contrast, an alternative fuel system may control the high pressure pump 104 such that it consistently delivers at least a small quantity of fuel on every stroke cycle. The volume of fuel provided by the high pressure pump 104, in this system, is controlled by varying the amount of fuel entering the inlet of the pump 104. The graphs of FIGS. 3A and 3B illustrate the responses of a fuel system in which the high pressure pump 104 delivers fuel on every stroke cycle.

Figure 3B:
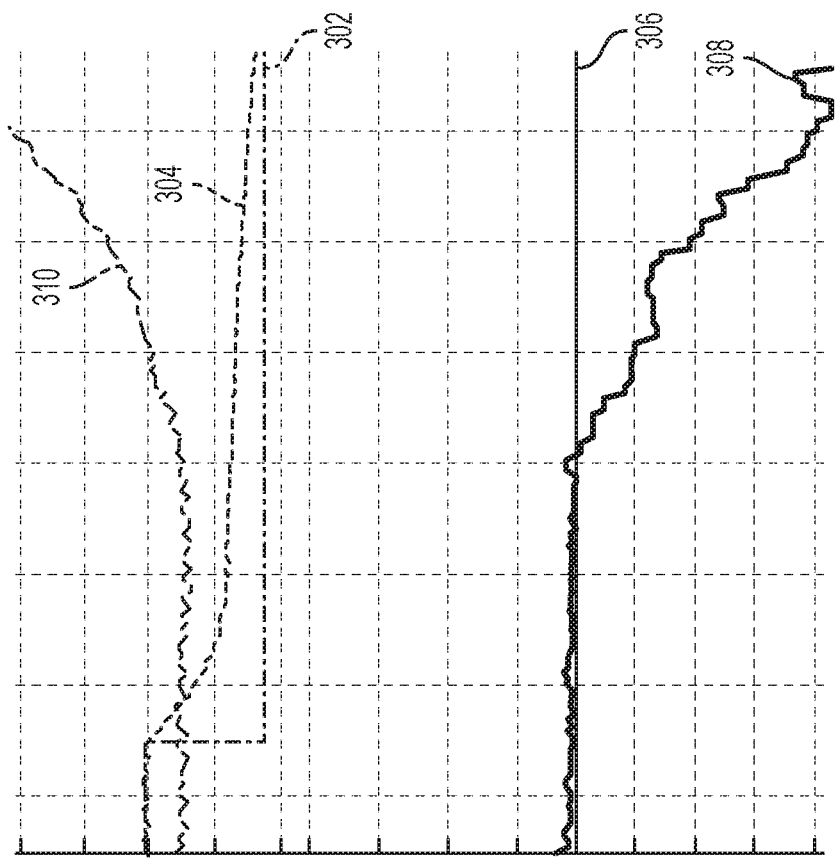
FIG. 3B illustrates signals where the system detects fuel vapor.
Figure 3A:
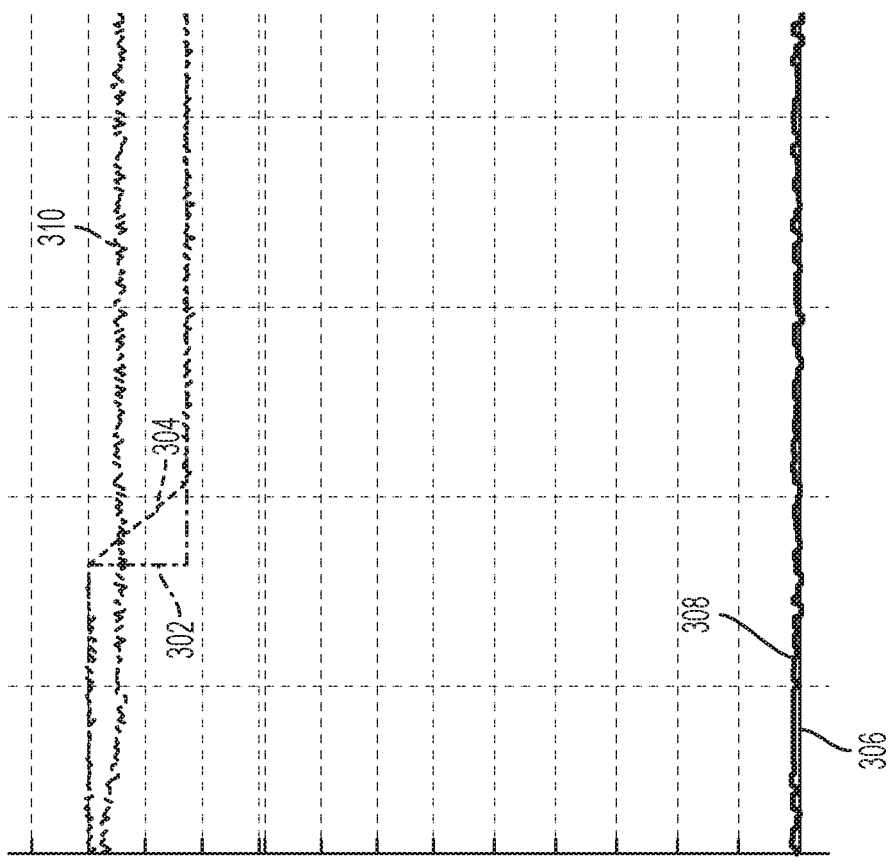
FIG. 3A illustrates signals from an exemplary system of the present disclosure where fuel vapor is not detected.

The graph of FIG. 3A illustrates signals from an exemplary system of the present disclosure where fuel vapor is not detected and the graph of FIG. 3B illustrates signals where the system detects fuel vapor. Referring first to FIG. 3A, target fuel feed line pressure is indicated at 302, the actual or measured fuel feed line pressure 126 is indicated by line 304, the target fuel rail pressure is indicated at 306, and the fuel rail pressure 130 is indicated at 308. The fuel delivery duration for each cycle of the high pressure pump 104 is indicated at 310. During operation of the method and system of the present disclosure, the fuel feed line module 146 sends a command 152 to the low pressure pump 110 to decrease the target fuel feed pressure 302. In response, the actual fuel feed line pressure 304 immediately begins ramping down, based upon the amount of fuel being removed from the fuel feed line 106 by the high pressure pump 104 and quickly reaches the new, lower targeted fuel feed line pressure 302. In this instance, because the feed line pressure 304 has not reached the vapor pressure of the fuel, the fuel rail pressure 308 closely tracks the targeted fuel rail pressure 306 and, as a result, the delivery duration 310 of the high pressure pump remains substantially constant through the fuel feed pressure decrease. In this instance, the actual fuel feed pressure 304 ramps down linearly in proportion to the liquid fuel volume removed by the high pressure pump, and the linear behavior continues until meeting the target pressure 302. In an exemplary aspect, the system and method of the present disclosure may record the fuel feed pressure 126 and the fuel temperature as a data point indicating no fuel vaporization. In this instance, the fuel feed pressure 126 is decreased from about 400 KPa to about 220 KPa at a temperature of about 32 degrees Celsius without fuel vaporization.

In contrast, referring now to FIG. 3B, the exemplary system and method of the present disclosure detects fuel vaporization at a different temperature than that of FIG. 3A for the same fuel. In this instance, the exemplary system and method of the present disclosure detects fuel vaporization at a temperature of about 82 degrees Celsius at a fuel feed pressure 126 of about 280 KPa. Again, the target fuel feed pressure 302 is decreased to about 220 KPa. However, at least a portion of the fuel in the feed line 106 vaporizes, which results in the fuel feed line pressure 304 taking a significantly longer time to approach the target fuel feed pressure. Immediately, after the step down in target fuel feed pressure 302, the fuel feed line pressure 304 starts to decrease but the slope of that pressure 304 decrease starts to reduce and is not constant, as it was in FIG. 3A. Rather, the fuel feed line pressure 304 includes a "knee" or curve upward which reduces the rate at which it approaches the target fuel feed pressure 302. In response, an exemplary embodiment of the vapor detection module 150 may compare the fuel feed pressure 304 with the target fuel feed pressure 302 at a predetermined amount of time after the step down and, if the difference between the actual and targeted pressures are large enough, the system and method may determine that at least a portion of the fuel has vaporized.

In another exemplary embodiment, the vapor detection module 150 may monitor the fuel delivery duration 310 of the high pressure pump 104 to determine whether and when a portion of the fuel may have vaporized. When a portion of the fuel vaporizes, the amount of fuel being delivered by the high pressure pump 104 for any given amount of delivery duration 310 decreases, which results in a gradual decrease and/or inability of the fuel rail pressure 308 to closely track the targeted fuel rail pressure 306. In response to the fuel rail pressure 308 deviating from the targeted fuel rail pressure 306, a controller (not illustrated) for the high pressure pump 104 may start to adjust the fuel delivery duration 310 for each stroke cycle of the high pressure pump 104 in an attempt to compensate and/or correct the deviation. Since, in this instance, the fuel feed pressure 304 is below a vapor pressure of at least a component of the fuel, the high pressure pump 310 is unable to compensate and the delivery duration 310 will continually to gradually increase. Thus, in an exemplary embodiment, the vapor detection module 150 may analyze the delivery duration 310 and if the amplitude of that duration 310 alters by a predetermined amount, then the vapor detection module 150 may determine that a portion of the fuel has vaporized.

Figure 4:
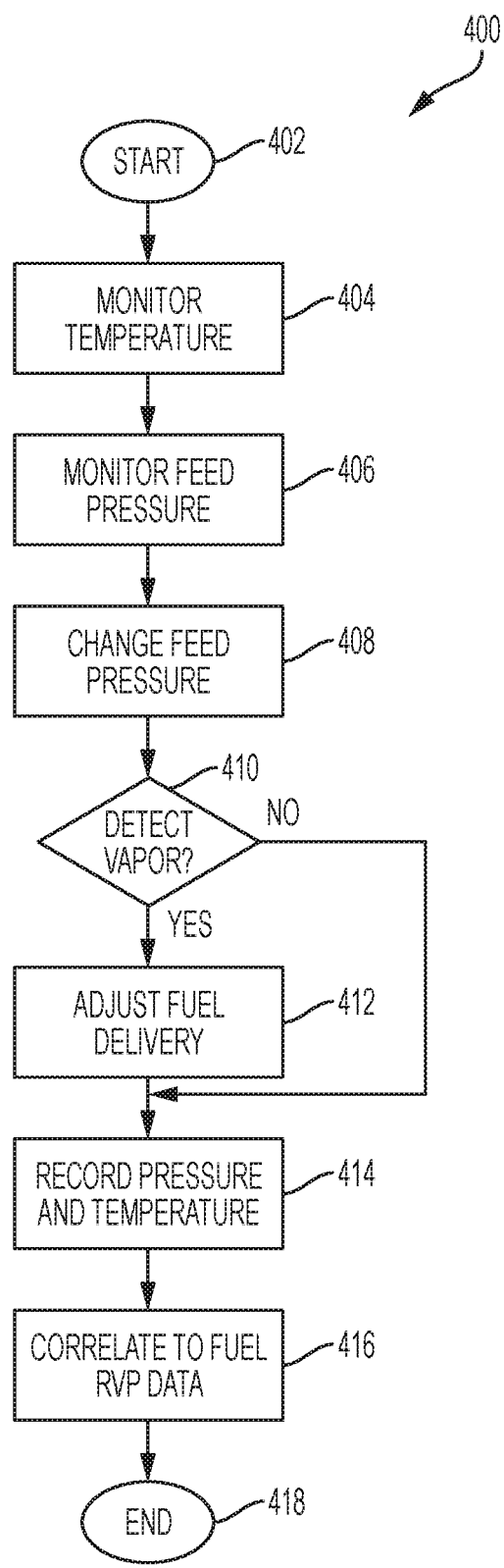
FIG. 4 illustrates a flowchart 400 of a method in accordance with an exemplary embodiment the present disclosure.

FIG. 4 illustrates a flowchart 400 of a method in accordance with an exemplary embodiment the present disclosure. The method starts at step 402 and continues to step 404. In step 404, the fuel temperature module 142 of the controller 118 monitors the temperature of the fuel. The method continues to step 406 where the fuel feed line module 146 monitors the pressure of the fuel feed line 106 and the method then continues to step 408. In step 408, the fuel feed line module 146 changes the pressure in the fuel feed line 106. In particular, the fuel feed line module 146 may decrease the pressure in the fuel feed line 106 in a manner, an example of which, has previously been described. The method may then continue to step 410, in which the vapor detection module 150 determines whether vapor is detected in the fuel feed line 106. If, in step 410, the vapor detection module 150 determines that vapor has been detected in the fuel feed line 106, then the fuel system RVP adapt module 144 may adjust fuel delivery parameters in accordance with the detection. For example, as explained previously, the fuel system RVP adapt module 144, may increase the feed line pressure such that it remains above the vapor pressure of the fuel, adjust operation of the high pressure pump 104, fuel delivery by the fuel injectors 108 and the like without limitation.

The method then continues to step 414 where the pressure and temperature of the fuel may be stored along with an indicator which indicates whether fuel vaporization was detected or not. The method then continues to step 416 where the data that has been collected, including the pressure, temperature, and vapor detection indicators, may be analyzed and correlated with existing and known temperature, pressure, and vapor characteristics of fuels having known distillation curves and associated reid vapor pressure values. In this manner, the present disclosure enables detection of fuel vaporization and identification of the reid vapor pressure of fuel.

In an optional embodiment, the method may further include the engine mode module 136 monitoring the operating mode of the engine and the RVP learn enable module 138 determining whether the operating mode of the engine is appropriate to initiate or enable the RVP learn module 140 and/or the engine control module 118 to perform the method illustrated in the flowchart 400 of FIG. 4.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A gasoline reid vapor detection system in vehicle propulsion system comprising:
   a first pump having an inlet for receiving fuel from a fuel reservoir and an outlet for providing pressurized fuel to a fuel feed line at a first pressure;
   a fuel feed line pressure sensor that generates a fuel feed line pressure signal that is based upon a pressure of fuel in the fuel feed line;
   a second pump having an inlet for receiving fuel from the fuel feed line and an outlet for providing pressurized fuel to an engine fuel rail at a second pressure, the second pressure being higher than the first pressure;

a fuel temperature sensor that generates a fuel temperature signal that is based upon a temperature of the fuel;

a fuel rail pressure sensor that generates a fuel rail pressure signal based upon a pressure of fuel in the fuel rail; and a controller in communication with the first pump for controlling the first pump to control the pressure of the fuel in the fuel feed line, wherein the controller controls the first pump to reduce the pressure of the fuel in the fuel feed line, and wherein the controller determines whether the pressure of the fuel in the fuel feed line has reached a vaporization pressure of a component in the fuel, wherein the controller monitors a performance characteristic of the second pump to determine whether the pressure of the fuel in the fuel feed line has reached a vaporization pressure of a component in the fuel, wherein the second pump performance characteristic comprises a fuel rail pressure rise in the fuel rail per stroke of the second pump, wherein the controller generates a slow filtered signal based upon a slow filter of the fuel rail pressure rise in the fuel rail per stroke of the second pump and a fast filtered signal based upon a fast filter of the fuel rail pressure rise in the fuel rail per stroke of the second pump, and wherein the controller determines whether the pressure of the fuel in the fuel feed line has reached a vaporization pressure of a component in the fuel based upon a comparison of the slow filtered signal to the fast filtered signal.

2. The system of claim 1, wherein the controller determines whether the pressure of the fuel in the fuel feed line has reached a vaporization pressure of a component in the fuel based upon a determination that the slow filtered signal has a value that exceeds a value of the fast filtered signal.

* * * * *